United States Patent [19]

Weng

[11] Patent Number: 5,970,724
[45] Date of Patent: Oct. 26, 1999

[54] COOLING WATER TOWER

[75] Inventor: Kuo-Liang Weng, Taichung, Taiwan

[73] Assignee: Yiue Feng Enterprise Co., Ltd., Taichung Hsien, Taiwan

[21] Appl. No.: 09/102,200

[22] Filed: Jun. 22, 1998

[51] Int. Cl.⁶ .................................. F28D 5/00; F28C 1/00
[52] U.S. Cl. ................................. 62/121; 62/183; 62/305; 165/900
[58] Field of Search ............................. 62/201, 121, 183, 62/305; 165/900, 299

[56] References Cited

U.S. PATENT DOCUMENTS

| | | | |
|---|---|---|---|
| 3,130,557 | 4/1964 | McFarlan | 62/171 |
| 4,215,753 | 8/1980 | Champness | 62/201 X |
| 4,325,223 | 4/1982 | Cantley | 62/171 X |

*Primary Examiner*—William Wayner
*Attorney, Agent, or Firm*—Alan Kamrath; Oppenheimer, Wolff & Donnelly, LLP

[57] ABSTRACT

A cooling water tower has a water container, a fan motor, a controller, an air outlet, a first sensor, a second sensor, a pump, and an air conditioning device. The air conditioning device has an air cooling condenser, a freezing agent control device, a compressor, and an evaporator. The air outlet is disposed on a top portion of the water container. The first sensor is disposed on the air outlet. The second sensor is disposed on the bottom of the water container. The fan motor is disposed on the top portion of the water container. The controller is disposed on the fan motor.

3 Claims, 3 Drawing Sheets

COOLING WATER TOWER

BACKGROUND OF THE INVENTION

The present invention relates to a cooling water tower. More particularly, the present invention relates to a cooling water tower which has a control system to adjust the rotational speed of a fan motor according to the load of the cooling water tower.

Referring to FIG. 1, a conventional cooling water tower 1 has a water container 10, a fan motor 11, a pump 5', and an air conditioning device 2'. The air conditioning device 2' comprises an air cooling condenser 21', a freezing agent control device 22', a compressor 23', and an evaporator 24'. The pump 5' pumps water from the water container 10 to the air cooling condenser 21'. Since the heat radiation of the fan motor 11 cannot be adjusted according to the load of the cooling water tower, the temperature of the cooled water is often too low. Therefore, the condensing pressure decreases so that the flow amount of the freezing agent decreases also. The air conditioning device 2' will be overheated so that the freezing agent will be carbonized. Thus, the compressor 23' may be broken. Since the evaporation pressure decreases, the freezing agent cannot be evaporated. Thus, the compressor 23' may be broken also.

SUMMARY OF THE INVENTION

An object of the present invention is to provide a cooling water tower which has a control system to adjust the rotational speed of a fan motor according to the load of the cooling water tower.

Accordingly, a cooling water tower comprises a water container, a fan motor, a controller, an air outlet, a first sensor, a second sensor, a pump, and an air conditioning device. The air conditioning device comprises an air cooling condenser, a freezing agent control device, a compressor, and an evaporator. The air outlet is disposed on a top portion of the water container. The first sensor is disposed on the air outlet. The second sensor is disposed on the bottom of the water container. The fan motor is disposed on the top portion of the water container. The controller is disposed on the fan motor.

A control system of the cooling water tower comprises the fan motor, the controller, the air outlet, the first sensor, and the second sensor. The control system of the cooling water tower comprises the steps of:

Start a rotation of the fan motor and an operation of the controller.

Set a predetermined temperature value Ts. Detect a temperature value Ta of the water container.

Determine whether Ta is larger than Ts.

Determine whether Ta is larger than Ts plus a predetermined difference value X.

If Ta is larger than Ts plus X, the fan motor rotates at full speed.

If Ta is less than or equal to Ts plus X, the fan motor rotates in proportion to Ta.

Determine whether Ta is less than or equal to Ts.

If Ta is less than or equal to Ts, the fan motor rotates at a lowest speed.

DETAILED DESCRIPTION OF THE INVENTION

Figure 1:
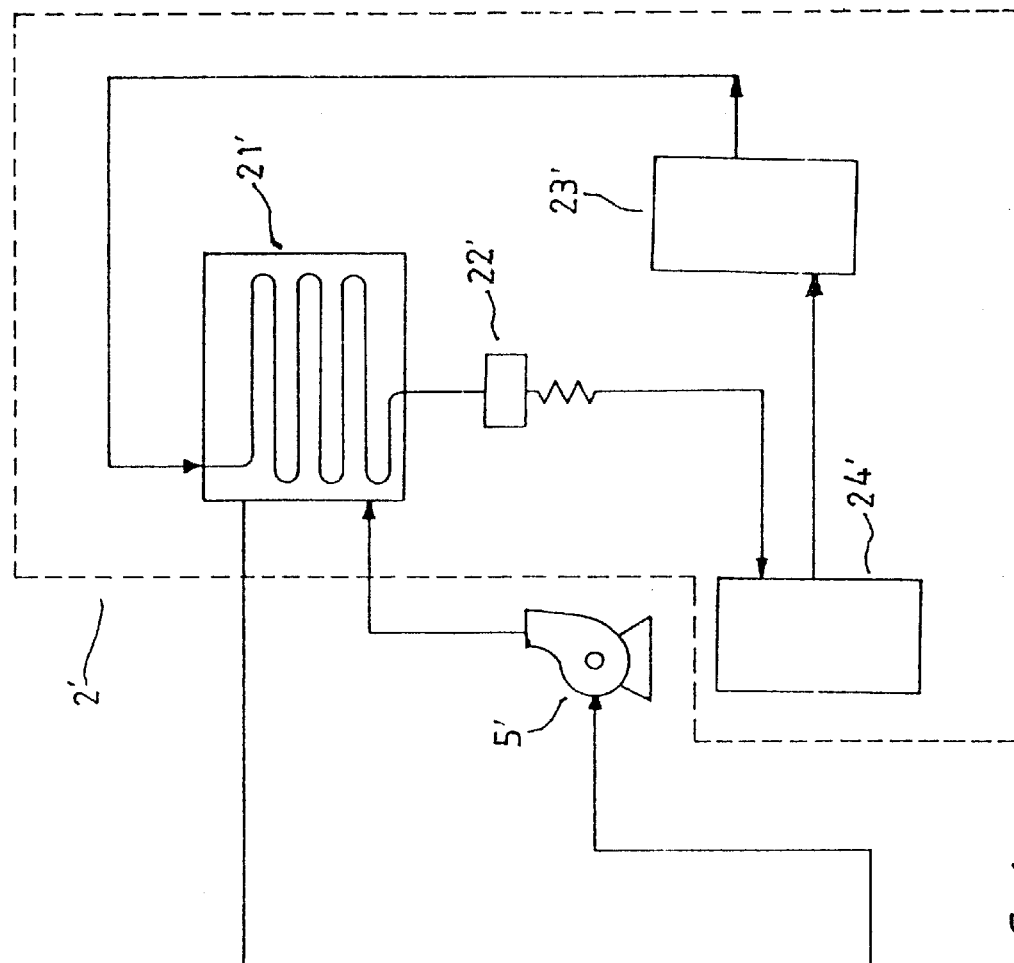
FIG. 1 is a schematic view illustrating a system of a cooling water tower of the prior art.
Figure 1:
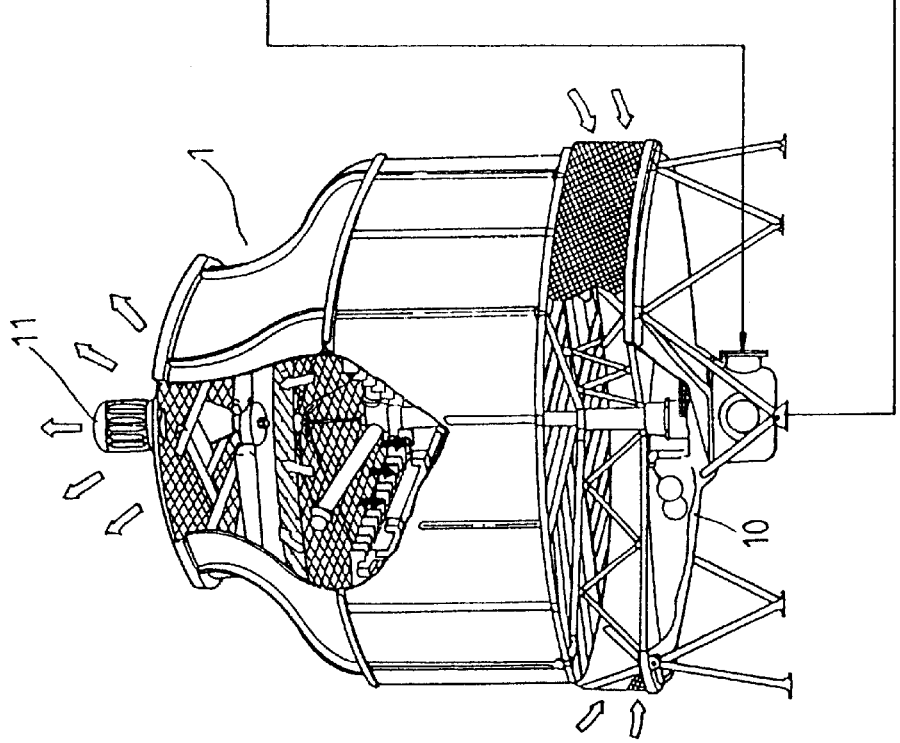
Figure 2:
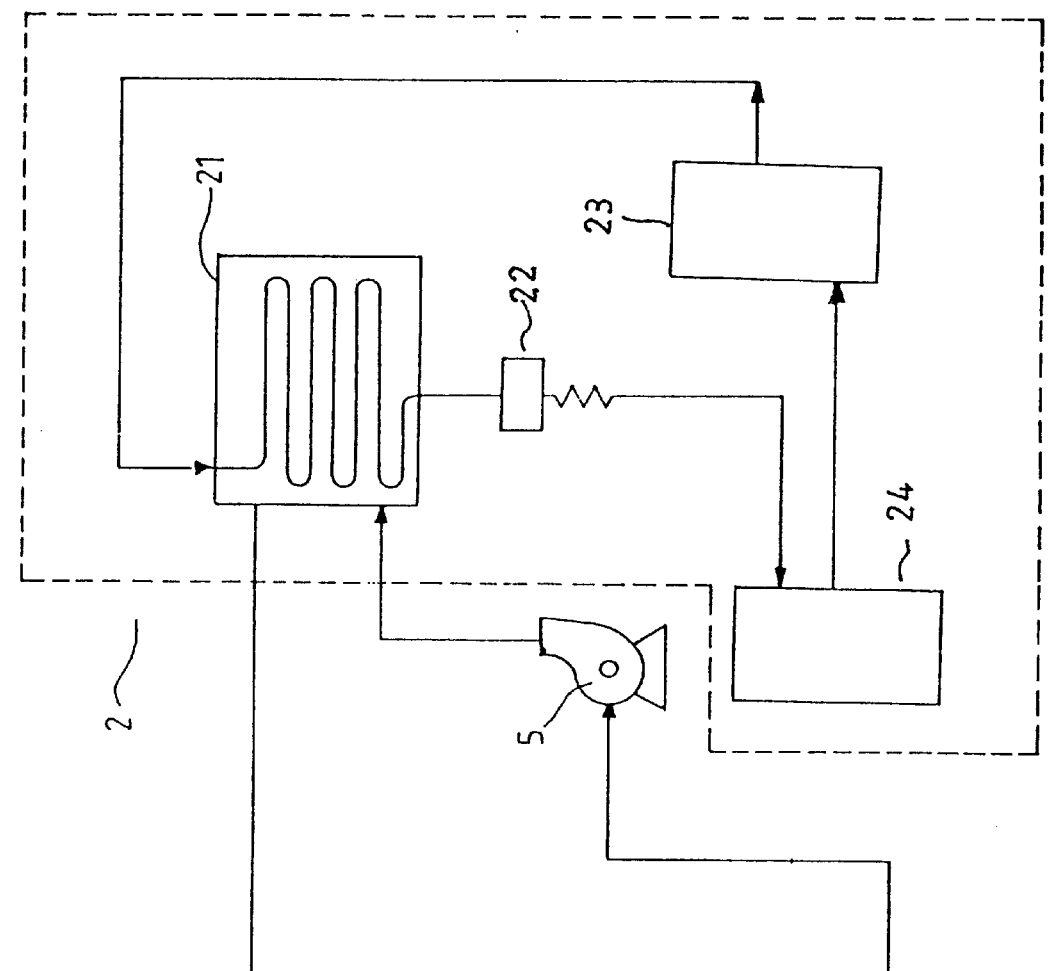
FIG. 2 is a schematic view illustrating a system of a cooling water tower of a preferred embodiment in accordance with the present invention.
Figure 2:
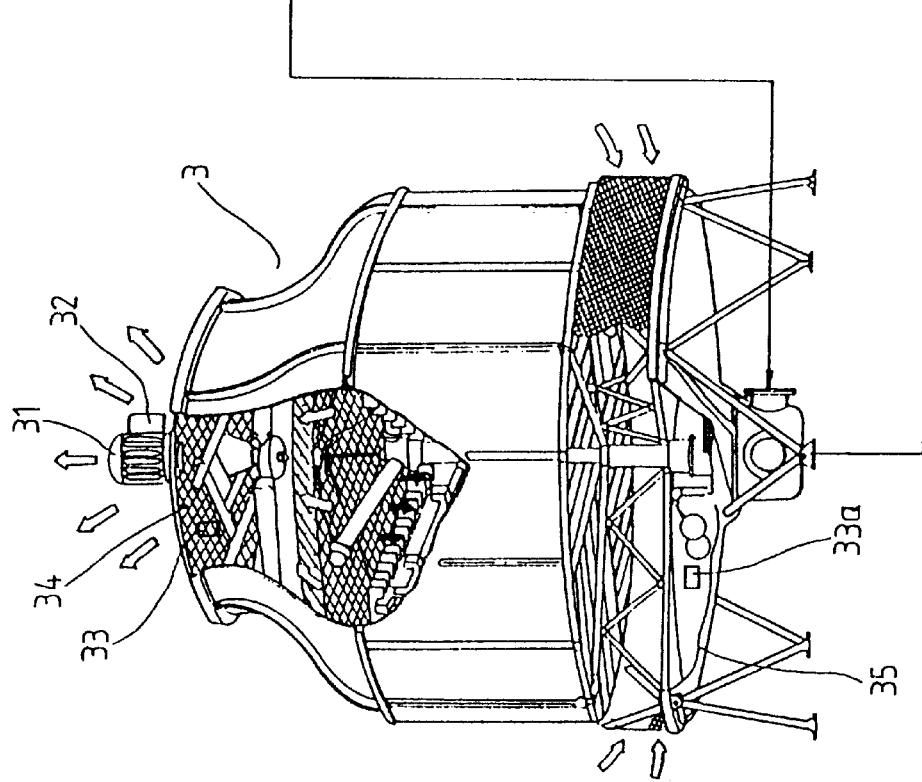

Referring to FIG. 2, a cooling water tower 3 comprises a water container 35, a fan motor 31, a controller 32, an air outlet 34, a first sensor 33, a second sensor 33a, a pump 5, and an air conditioning device 2. The air conditioning device 2 comprises an air cooling condenser 21, a freezing agent control device 22, a compressor 23, and an evaporator 24. The pump 5 pumps water from the water container 35 to the air cooling condenser 21.

The air outlet 34 is disposed on a top portion of the water container 35. The first sensor 33 is disposed on the air outlet 34. The second sensor 33a is disposed on the bottom of the water container 35. The fan motor 31 is disposed on the top portion of the water container 35. The controller 32 is disposed on the fan motor 31.

Figure 3:
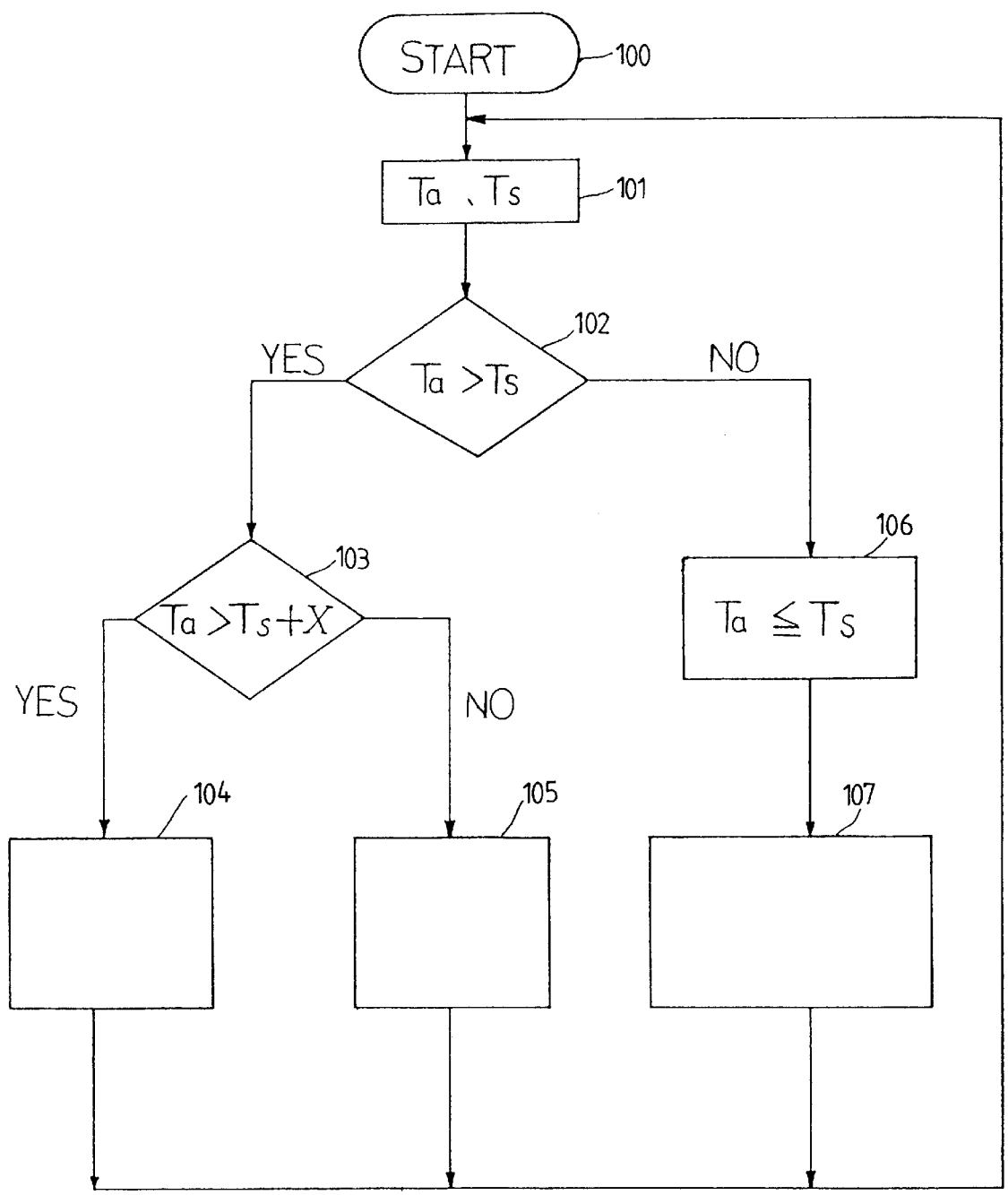
FIG. 3 is a flow diagram illustrating a control system of a cooling water tower of a preferred embodiment in accordance with the present invention.

Referring to FIGS. 2 and 3, a control system of the cooling water tower is provided by the present invention. The control system of the cooling water tower comprises the fan motor 31, the controller 32, the air outlet 34, the first sensor 33, and the second sensor 33a.

The control system of the cooling water tower comprises the steps of:

Step 100: Start a rotation of the fan motor 31 and an operation of the controller 32.

Step 101: Set a predetermined temperature value Ts. Detect a temperature value Ta of the water container 35.

Step 102: Determine whether Ta is larger than Ts.

Step 103: Determine whether Ta is larger than Ts plus a predetermined difference value X.

Step 104: If Ta is larger than Ts plus X, the fan motor 31 rotates at full speed.

Step 105: If Ta is less than or equal to Ts plus X, the fan motor 31 rotates in proportion to Ta.

Step 106: Determine whether Ta is less than or equal to Ts.

Step 107: If Ta is less than or equal to Ts, the fan motor 31 rotates at a lowest speed.

Therefore, the controller 32 can send a signal to the fan motor 31 in order to change the rotational speed of the fan motor 31.

The invention is not limited to the above embodiment but various modifications thereof may be made. Further, various changes in form and detail may be made without departing from the scope of the invention.

I claim:

1. A cooling water tower comprises:

a water container, a fan motor, a controller, an air outlet, a first sensor, a second sensor, a pump, and an air conditioning device, the pump pumps water from the water container to the air conditioning device, the air outlet disposed on a top portion of the water container, the first sensor disposed on the air outlet, the second sensor disposed on the bottom of the water container, the fan motor disposed on the top portion of the water container, and the controller disposed on the fan motor.

2. A control system of a cooling water tower comprises the steps of:

starting a rotation of a fan motor and an operation of a controller, setting a predetermined temperature value Ts, and detecting a temperature value Ta of a water container, determining whether Ta is larger than Ts, determining whether Ta is larger than Ts plus a predetermined difference value X, if Ta is larger than Ts plus X, the fan motor rotates in a full speed, if Ta is less than or equal to Ts plus X, the fan motor rotates in proportion to Ta, determining whether Ta is less than or equal to Ts, if Ta is less than or equal to Ts, the fan motor rotates in a lowest speed.

3. The cooling water tower of claim 2 wherein the air conditioning device comprises an air cooling condenser, a freezing agent control device, a compressor, and an evaporator, with the pump pumping water from the water container to the air cooling condenser.

* * * * *